(12) United States Patent
Fraser

(10) Patent No.: US 9,771,959 B2
(45) Date of Patent: Sep. 26, 2017

(54) FLUID FLOW MODIFIER AND FLUID TREATMENT SYSTEM INCORPORATING SAME

(71) Applicant: Jim Fraser, St. Thomas (CA)

(72) Inventor: Jim Fraser, St. Thomas (CA)

(73) Assignee: Trojan Technologies, London (CA)

( * ) Notice: Subject to any disclaimer, the term of this patent is extended or adjusted under 35 U.S.C. 154(b) by 362 days.

(21) Appl. No.: 14/373,487

(22) PCT Filed: Jan. 21, 2013

(86) PCT No.: PCT/CA2013/000043
§ 371 (c)(1),
(2) Date: Jul. 21, 2014

(87) PCT Pub. No.: WO2013/106914
PCT Pub. Date: Jul. 25, 2013

(65) Prior Publication Data
US 2014/0373955 A1    Dec. 25, 2014

Related U.S. Application Data

(60) Provisional application No. 61/632,210, filed on Jan. 20, 2012.

(51) Int. Cl.
*F16L 55/027* (2006.01)
*F15D 1/02* (2006.01)
(Continued)

(52) U.S. Cl.
CPC .............. *F15D 1/025* (2013.01); *C02F 1/325* (2013.01); *F15D 1/001* (2013.01); *F15D 1/04* (2013.01); *C02F 2201/328* (2013.01)

(58) Field of Classification Search
CPC . F16L 55/04; F16L 55/02745; F01N 13/1855; F01N 2310/14; F01N 2230/06
(Continued)

(56) References Cited

U.S. PATENT DOCUMENTS 1,666,257 A * 4/1928 Furnivall ................ F01N 1/081
181/258
2,090,719 A * 8/1937 Alt ........................ F16L 37/248
138/44
(Continued)

FOREIGN PATENT DOCUMENTS

CA        2336524 A1    12/2005
DE     102010047782       1/2012
(Continued)

OTHER PUBLICATIONS

Office Action for Canadian Patent Application No. 2,861,879 with a mailing date of Sep. 4, 2015.
(Continued)

*Primary Examiner* — Patrick F Brinson
(74) *Attorney, Agent, or Firm* — Katten Muchin Rosenman LLP

(57) ABSTRACT

A fluid flow modifier device comprising: an inlet portion for receiving a flow of fluid; an outlet portion for outputting the flow of fluid; and a flow modifier portion disposed between the inlet portion and the outlet portion, the flow modifier portion comprising an outer portion comprising a closed cross-section to the flow of fluid and an inner porous portion configured such that at least a portion of the flow received in the inlet portion must pass through the inner porous portion to reach the fluid outlet. The fluid flow modifier device is ideally used to transition fluid flow between an fluid supply line and a fluid treatment zone—for example, a pressure water supply line and an ultraviolet radiation treatment device (e.g., drinking water treatment device).

18 Claims, 7 Drawing Sheets

(51) Int. Cl.
*F15D 1/04* (2006.01)
*F15D 1/00* (2006.01)
*C02F 1/32* (2006.01)

(58) Field of Classification Search
USPC ....... 138/42, 41, 37; 181/258, 241, 252, 210
See application file for complete search history.

(56) References Cited

U.S. PATENT DOCUMENTS

| | | | |
|---|---|---|---|
| 2,185,584 A | 1/1940 | Boyce | |
| 3,154,388 A | 10/1964 | Purse | |
| 3,572,390 A | 3/1971 | McMichael | |
| 3,672,465 A * | 6/1972 | Blatt | F01N 1/082 181/258 |
| 3,677,300 A | 7/1972 | King | |
| 3,823,743 A * | 7/1974 | King | F16L 55/04 138/42 |
| 5,511,585 A | 4/1996 | Lee, II | |
| 6,089,346 A * | 7/2000 | Tredinnick | B25F 5/00 181/230 |
| 7,380,397 B2 * | 6/2008 | Chang | F01N 1/003 181/247 |
| 7,905,321 B2 * | 3/2011 | Ballard, III | F01N 1/24 181/241 |
| 2005/0263716 A1 | 12/2005 | From et al. | |
| 2008/0190689 A1 * | 8/2008 | Ballard | F01N 1/24 181/210 |
| 2009/0321181 A1 * | 12/2009 | Ballard, III | F01N 1/24 181/264 |

FOREIGN PATENT DOCUMENTS

| | | |
|---|---|---|
| FR | 2280436 | 2/1976 |
| JP | 2004036784 | 2/2004 |
| WO | 01/25154 A1 | 4/2001 |

OTHER PUBLICATIONS

Office Action for Canadian Patent Application No. 2,861,879 with a mailing date of Jun. 3, 2016.
Search Report for Chinese Patent Application No. 2013800059884.
Notification of the first office action for Chinese Patent Application No. 2013800059884 with a mailing date Dec. 3, 2015.
Office Action for Chinese Patent Application No. 201380005988.4 with as mailing date of Aug. 2, 2016.
Extended European Search Report for European Patent Application No. 13 73 8372 with a mailing date of Sep. 1, 2015.
Office Action for Canadian Patent Application No. 2,861,879 with a mailing date of Apr. 18, 2017.
Office Action for European Patent Application No. 13 738 372.5 with a mailing date of Mar. 23, 2017.

* cited by examiner

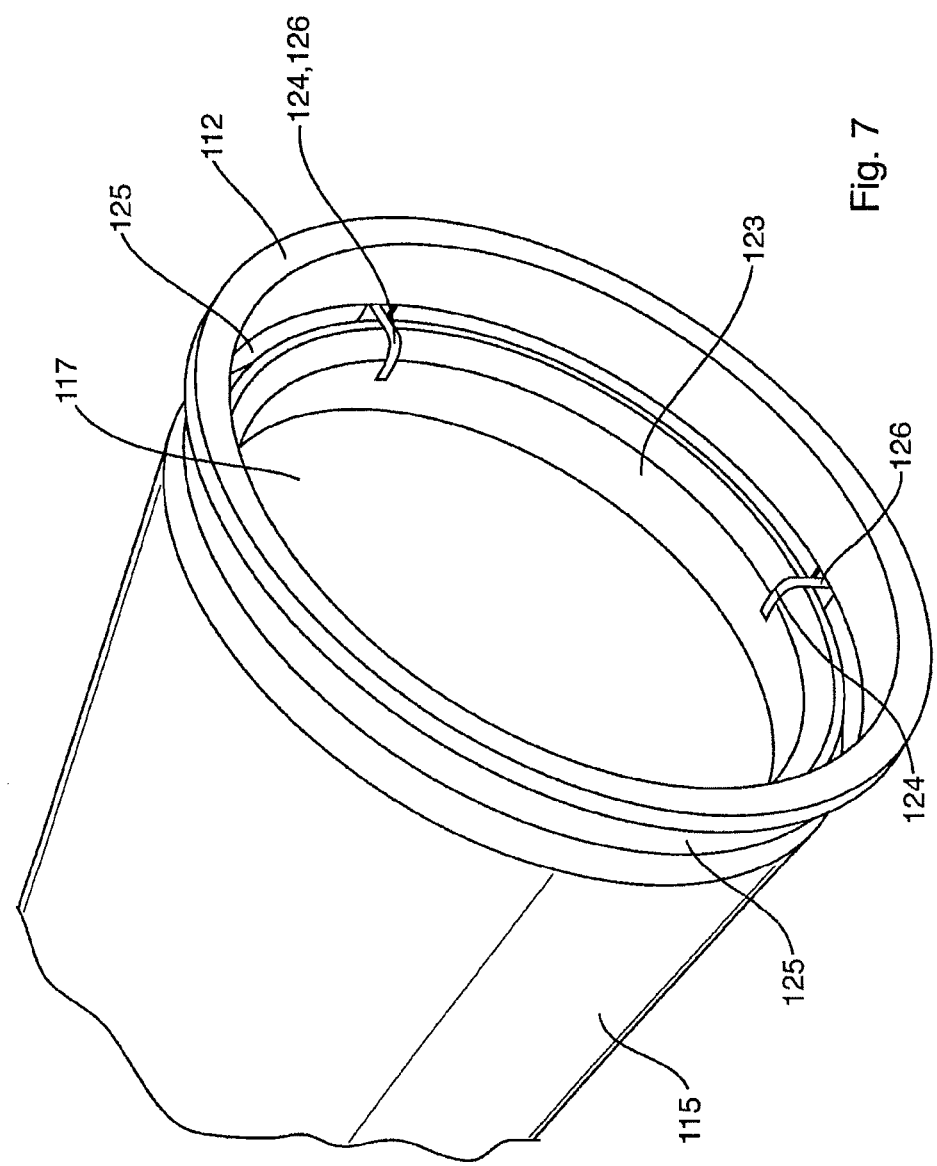

FLUID FLOW MODIFIER AND FLUID TREATMENT SYSTEM INCORPORATING SAME

CROSS-REFERENCE TO RELATED APPLICATION

The present application claims the benefit under 35 U.S.C. §119(e) of provisional patent application Ser. No. 61/632,210, filed Jan. 20, 2012, the contents of which are hereby incorporated by reference.

BACKGROUND OF THE INVENTION

Field of the Invention

In one of its aspects, the present invention relates to a fluid flow modifier device. In another of its aspects, the present invention relates to a fluid treatment system incorporating such a fluid flow modifier device.

Description of the Prior Art

Fluid treatment systems are generally known in the art. More particularly, ultraviolet (UV) radiation fluid treatment systems are generally known in the art. Early treatment systems comprised a fully enclosed chamber design containing one or more radiation (preferably UV) lamps. Certain problems existed with these earlier designs. These problems were manifested particularly when applied to large open flow treatment systems which are typical of larger scale municipal waste water or potable water treatment plants. Thus, these types of reactors had associated with them the following problems:

relatively high capital cost of reactor;
difficult accessibility to submerged reactor and/or wetted equipment (lamps, sleeve cleaners, etc);
difficulties associated with removal of fouling materials from fluid treatment equipment;
relatively low fluid disinfection efficiency, and/or
full redundancy of equipment was required for maintenance of wetted components (sleeves, lamps and the like).

The shortcomings in conventional closed reactors led to the development of the so-called "open channel" reactors.

For example, U.S. Pat. Nos. 4,482,809, 4,872,980 and 5,006,244 (all in the name of Maarschalkerweerd and all assigned to the assignee of the present invention and hereinafter referred to as the Maarschalkerweerd #1 patents) all describe gravity fed fluid treatment systems which employ ultraviolet (UV) radiation.

Such systems include an array of UV lamp modules (e.g., frames) which include several UV lamps each of which are mounted within sleeves which extend between and are supported by a pair of legs which are attached to a crosspiece. The so-supported sleeves (containing the UV lamps) are immersed into a fluid to be treated which is then irradiated as required. The amount of radiation to which the fluid is exposed is determined by the proximity of the fluid to the lamps, the output wattage of the lamps and the flow rate of the fluid past the lamps. Typically, one or more UV sensors may be employed to monitor the UV output of the lamps and the fluid level is typically controlled, to some extent, downstream of the treatment device by means of level gates or the like.

The Maarschalkerweerd #1 patents teach fluid treatment systems which were characterized by improved ability to extract the equipment from a wetted or submerged state without the need for full equipment redundancy. These designs compartmentalized the lamp arrays into rows and/or columns and were characterized by having the top of the reactor open to provide free-surface flow of fluid in a "top open" channel.

The fluid treatment system taught in the Maarschalkerweerd #1 patents were characterized by having a free-surface flow of fluid (typically the top fluid surface was not purposely controlled or constrained). Thus, the systems would typically follow the behaviour of open channel hydraulics. Since the design of the system inherently comprised a free-surface flow of fluid, there were constraints on the maximum flow each lamp or lamp array could handle before either one or other hydraulically adjoined arrays would be adversely affected by changes in water elevation. At higher flows or significant changes in the flow, the unrestrained or free-surface flow of fluid would be allowed to change the treatment volume and cross-sectional shape of the fluid flow, thereby rendering the reactor relatively ineffective. Provided that the power to each lamp in the array was relatively low, the subsequent fluid flow per lamp would be relatively low. The concept of a fully open channel fluid treatment system would suffice in these lower lamp power and subsequently lower hydraulically loaded treatment systems. The problem here was that, with less powerful lamps, a relatively large number of lamps was required to treat the same volume of fluid flow. Thus, the inherent cost of the system would be unduly large and/or not competitive with the additional features of automatic lamp sleeve cleaning and large fluid volume treatment systems.

This led to the so-called "semi-enclosed" fluid treatment systems.

U.S. Pat. Nos. 5,418,370, 5,539,210 and Re36,896 (all in the name of Maarschalkerweerd and all assigned to the assignee of the present invention and hereinafter referred to as the Maarschalkerweerd #2 patents) all describe an improved radiation source module for use in gravity fed fluid treatment systems which employ UV radiation. Generally, the improved radiation source module comprises a radiation source assembly (typically comprising a radiation source and a protective (e.g., quartz) sleeve) sealingly cantilevered from a support member. The support member may further comprise appropriate means to secure the radiation source module in the gravity fed fluid treatment system.

Thus, in order to address the problem of having a large number of lamps and the incremental high cost of cleaning associated with each lamp, higher output lamps were applied for UV fluid treatment. The result was that the number of lamps and subsequent length of each lamp was dramatically reduced. This led to commercial affordability of automatic lamp sleeve cleaning equipment, reduced space requirements for the treatment system and other benefits. In order to use the more powerful lamps (e.g. medium pressure UV lamps), the hydraulic loading per lamp during use of the system would be increased to an extent that the treatment volume/cross-sectional area of the fluid in the reactor would significantly change if the reactor surface was not confined on all surfaces, and hence such a system would be rendered relatively ineffective. Thus, the Maarschalkerweerd #2 patents are characterized by having a closed surface confining the fluid being treated in the treatment area of the reactor. This closed treatment system had open ends which, in effect, were disposed in an open channel. The submerged or wetted equipment (UV lamps, cleaners and the like) could be extracted using pivoted hinges, sliders and various other devices allowing removal of equipment from the semi-enclosed reactor to the free surfaces.

The fluid treatment system described in the Maarschalkerweerd #2 patents was typically characterized by relatively short length lamps which were cantilevered to a substantially vertical support arm (i.e., the lamps were supported at one end only). This allowed for pivoting or other extraction of the lamp from the semi-enclosed reactor. These significantly shorter and more powerful lamps inherently are characterized by being less efficient in converting electrical energy to UV energy. The cost associated with the equipment necessary to physically access and support these lamps was significant.

Historically, the fluid treatment modules and systems described in the Maarschalkerweerd #1 and #2 patents have found widespread application in the field of municipal waste water treatment (i.e., treatment of water that is discharged to a river, pond, lake or other such receiving stream).

In the field of municipal drinking water, it is known to utilize so-called "closed" fluid treatment systems or "pressurized" fluid treatment systems.

Closed fluid treatment devices are known—see, for example, U.S. Pat. No. 5,504,335 (Maarschalkerweerd #3). Maarschalkerweerd #3 teaches a closed fluid treatment device comprising a housing for receiving a flow of fluid. The housing comprises a fluid inlet, a fluid outlet, a fluid treatment zone disposed between the fluid inlet and the fluid outlet, and at least one radiation source module disposed in the fluid treatment zone. The fluid inlet, the fluid outlet and the fluid treatment zone are in a collinear relationship with respect to one another. The at least one radiation source module comprises a radiation source sealably connected to a leg which is sealably mounted to the housing. The radiation source is disposed substantially parallel to the flow of fluid. The radiation source module is removable through an aperture provided in the housing intermediate to fluid inlet and the fluid outlet thereby obviating the need to physically remove the device for service of the radiation source.

U.S. Pat. No. 6,500,346 [Taghipour et al. (Taghipour)] also teaches a closed fluid treatment device, particularly useful for ultraviolet radiation treatment of fluids such as water. The device comprises a housing for receiving a flow of fluid. The housing has a fluid inlet, a fluid outlet, a fluid treatment zone disposed between the fluid inlet and the fluid outlet and at least one radiation source having a longitudinal axis disposed in the fluid treatment zone substantially transverse to a direction of the flow of fluid through the housing. The fluid inlet, the fluid outlet and the fluid treatment zone are arranged substantially collinearly with respect to one another. The fluid inlet has a first opening having: (i) a cross-sectional area less than a cross-sectional area of the fluid treatment zone, and (ii) a largest diameter substantially parallel to the longitudinal axis of the at least one radiation source assembly.

Practical implementation of known fluid treatment systems of the type described above have been such that the longitudinal axis of the radiation source is: (i) parallel to the direction of fluid flow through the fluid treatment system, or (ii) orthogonal to the direction of fluid flow through the fluid treatment system. Further, in arrangement (ii), it has been common to place the lamps in an array such that, from an upstream end to a downstream end of the fluid treatment system, a downstream radiation source is placed directly behind an upstream radiation source.

In most applications, the fluid treatment system inlet has a cross-sectional area that is significantly larger than the cross-sectional area of the supply pipe feeding fluid to the fluid treatment system. Consequently, is has been known in the art to utilize a transition flow modifier device to connect the supply pipe to the fluid treatment system. Known fluid flow transition modifier devices have necessarily long lengths so that the transition to the larger cross-sectional area of the fluid treatment system can be done while avoiding jetting or so-called dead spots in both the fluid flow modifier device and the fluid treatment system. This is especially the case where there is a bend in the fluid supply pipe just upstream of the fluid treatment system.

A number of problems are created by the necessity of taking the approach of using a relatively long fluid flow modifier device. First, the use of such a device necessarily requires a relatively large footprint for the fluid flow modifier device. Practically, this manifests itself as a need to have a fluid flow modifier device that is about 5-10 times the length of the diameter of the outlet of the flow modifier device and/or the inlet of the fluid treatment system. Thus, for a conventional 2 foot diameter radiation fluid treatment system it has been conventional to use a fluid flow modifier device that is 10-20 feet in length. The space footprint need to accommodate such a fluid flow modifier device is significant and, in many cases, there simply is insufficient space to accommodate the fluid flow modifier device. Second, because of the long length of the device, the capital costs thereof are relatively high and serve to increase the overall cost of the fluid treatment system.

Given these problems in the art, it would be highly desirable to have a fluid flow modifier device which could be used to accomplish the same function as conventional fluid flow modifier devices but while occupying a smaller footprint—e.g., less than or equal to about 3.5 times the inner diameter of the outlet portion of the fluid flow modifier device and/or the inlet portion of the fluid treatment system to which the fluid flow modifier device is to be coupled. It would be highly desirable if such a device could be implemented in a small footprint while obviating and/or mitigating the occurrence of jetting and/or dead spots during transition of fluid flow.

SUMMARY OF THE INVENTION

It is an object of the present invention to obviate or mitigate at least one of the above-mentioned disadvantages of the prior art.

It is another object of the present invention to provide a novel fluid flow modifier device which obviates and/or mitigates at least one of the above mentioned disadvantages of the prior art.

Accordingly, in one of its aspects, the present invention provides a fluid flow modifier device comprising:

an inlet portion for receiving a flow of fluid;

an outlet portion for outputting the flow of fluid;

a flow modifier portion disposed between the inlet portion and the outlet portion, the flow modifier portion comprising an outer portion comprising a closed cross-section to the flow of fluid and an inner porous portion configured such that at least a portion of the flow received in the inlet portion must pass through the inner porous portion to reach the fluid outlet.

In another of its aspects, the present invention provides a fluid treatment system comprising the present fluid flow modifier device.

Thus, the inventor has discovered a novel fluid flow modifier device which can be used in a significantly smaller footprint than conventional fluid flow modified devices. In addition, the present fluid flow modifier device is characterized by obviating and/or mitigating the occurrence of jetting during transition of the flow from an inlet portion of the device to an outlet portion of the device.

In a preferred embodiment, the fluid flow modifier device comprises a porous inner portion surrounded by a confining outer portion. In essence, this results in the formation of a relatively high pressure zone upstream of the porous portion and the relatively low pressure zone downstream of the porous portion. While not wishing to be bound by any particular theory or mode of action, it is believed that the provision of such a porous portion allows for partial flow in the centre, high velocity section of the fluid flow modifier device and consequently minimizes the occurrence of high fluid flow velocity variation across the cross-sectional area at the outlet of the fluid flow modifier device that can result in jetting. This is believed to allow for the ability to construct a present fluid flow modifier device to have a relatively short length compared to conventional fluid flow modifier devices—preferably less than or equal to about 3.5 times the diameter of the outlet portion of the fluid flow modifier device and/or the diameter of the fluid treatment system (typically the same as the outlet portion of a fluid flow modifier device).

BRIEF DESCRIPTION OF THE DRAWINGS

Embodiments of the present invention will be described with reference to the accompanying drawings, wherein like reference numerals denote like parts, and in which:

FIG. 7 illustrates an enlarged perspective view from a downstream end of the fluid modifier device illustrated in FIGS. 1-5.

DETAILED DESCRIPTION OF THE PREFERRED EMBODIMENTS

Figure 1:
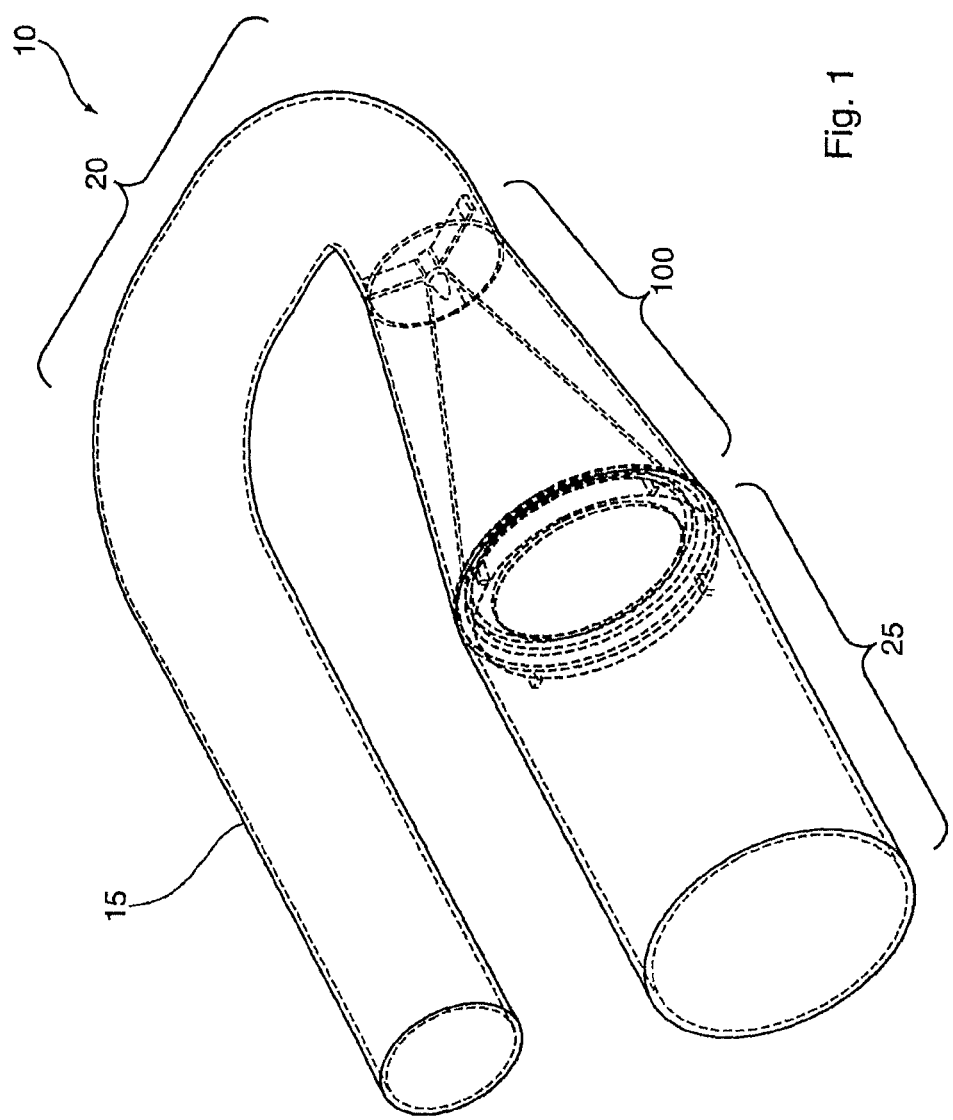
FIG. 1 illustrates a perspective schematic view of incorporation of the preferred embodiment of the present fluid flow modifier device into a fluid treatment system.
Figure 2:
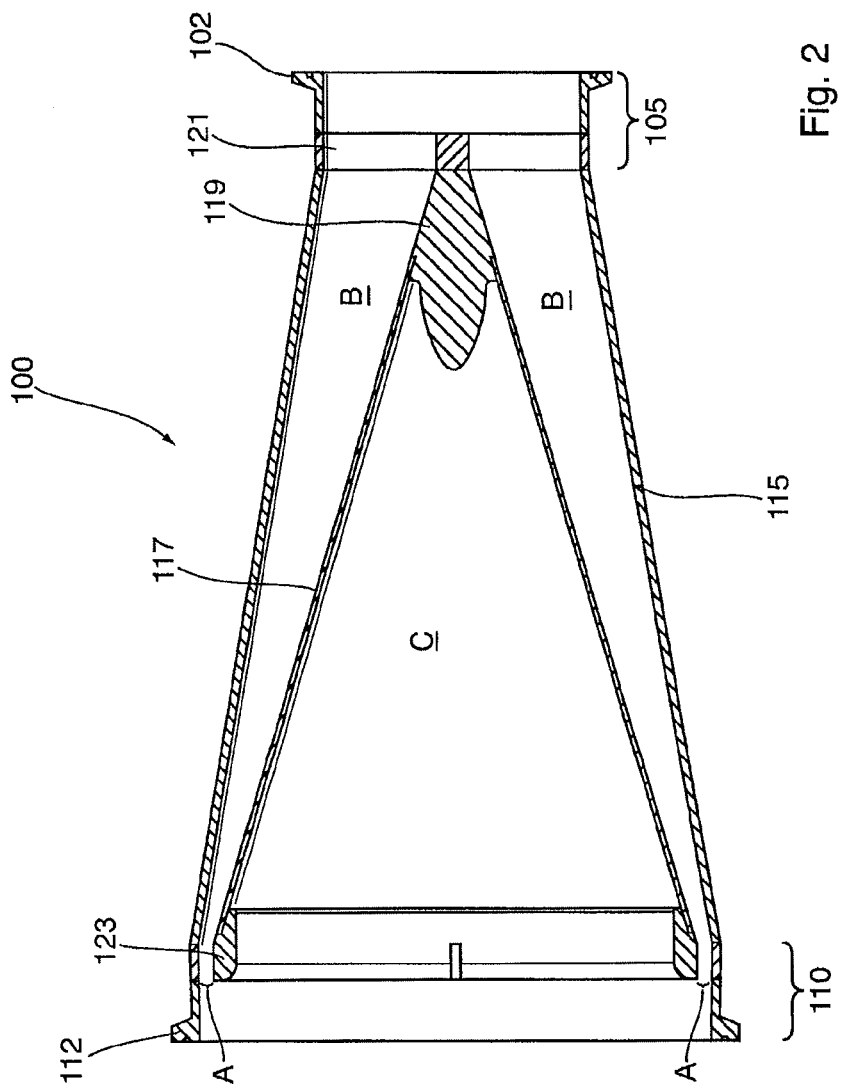
FIG. 2 illustrates a section view of a preferred embodiment of the present fluid flow modifier device.
Figure 3:
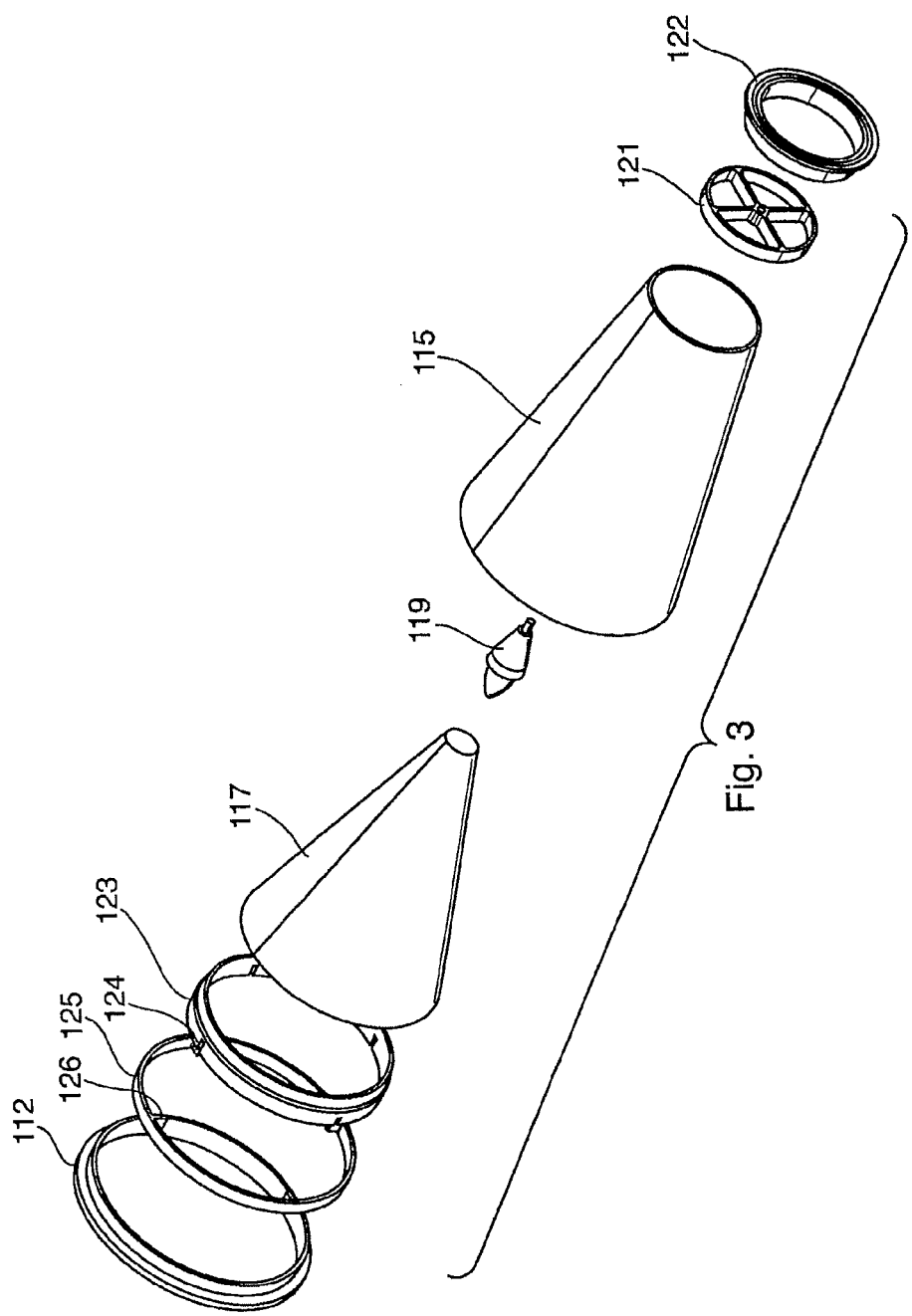
FIG. 3 illustrates a perspective view various of the components of the fluid flow modifier device illustrated in FIG. 2.
Figure 4:
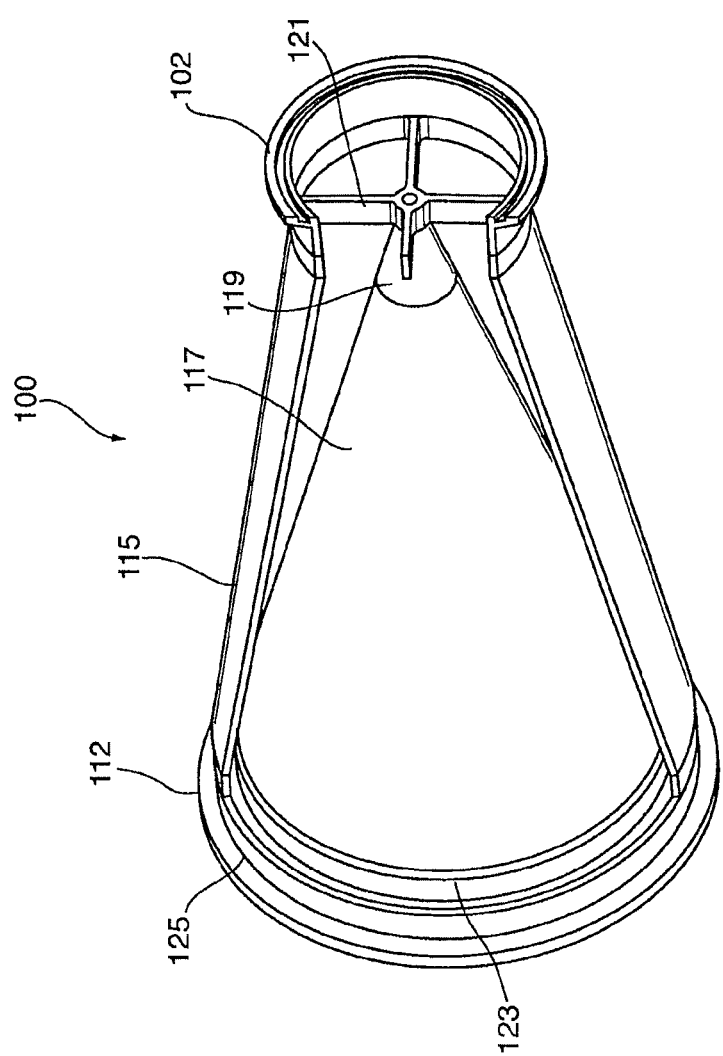
FIGS. 4-5 illustrate perspective, cutaway views of the fluid flow modifier device illustrated in FIGS. 2 and 3.
Figure 5:
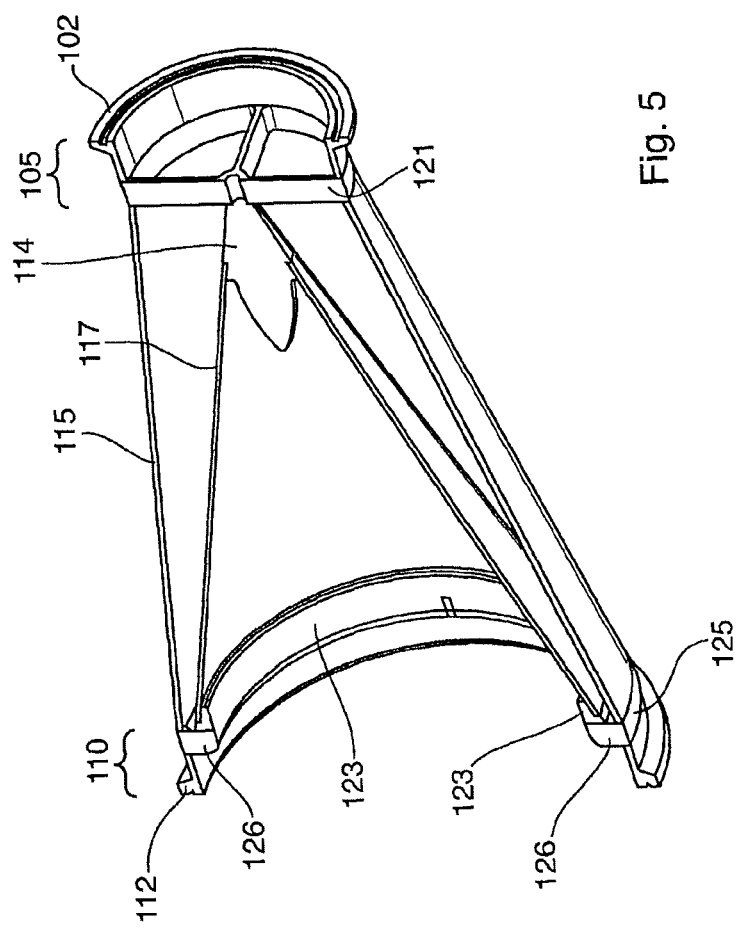
Figure 6:
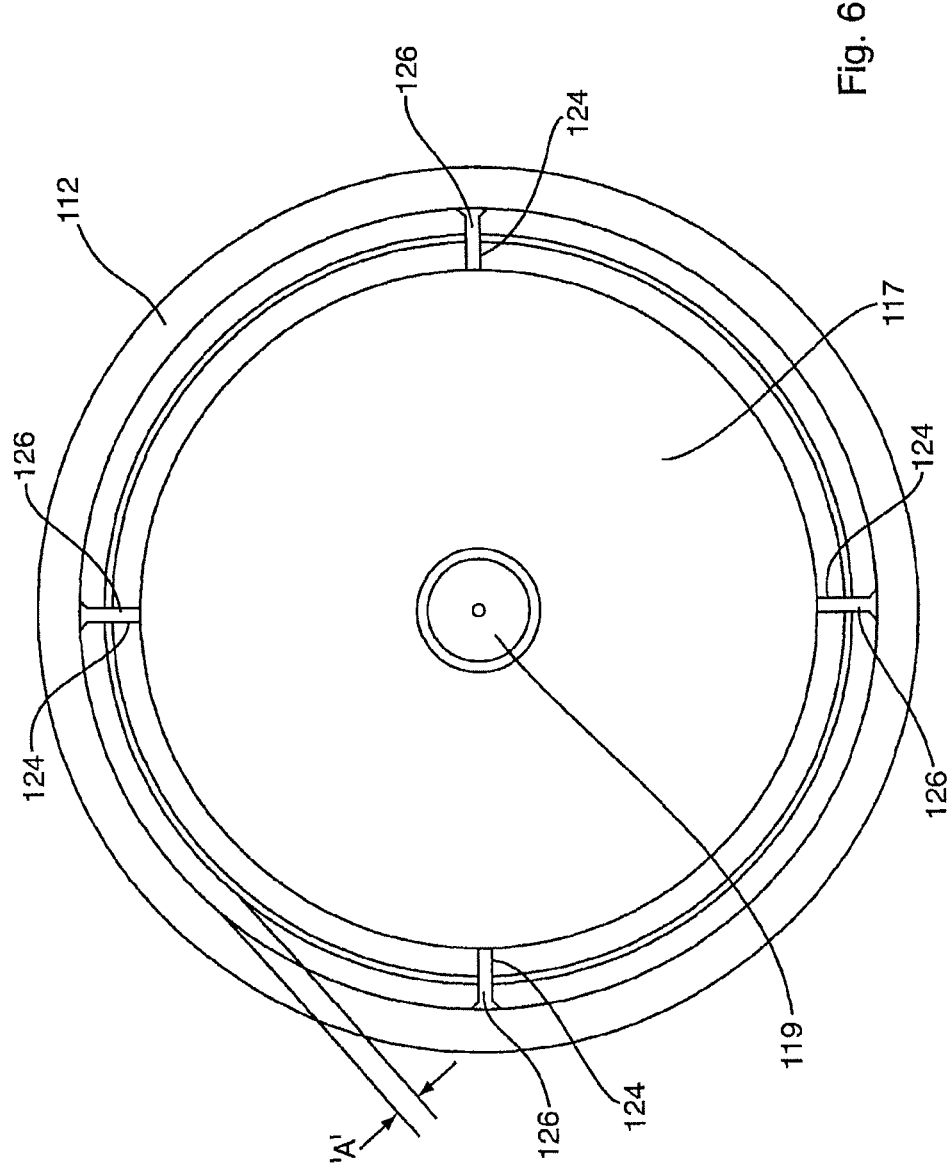
FIG. 6 illustrates an end view from a downstream end of the fluid modifier device illustrated in FIGS. 1-5.

In one of its aspects, the present invention relates to a fluid flow modifier device comprising: an inlet portion for receiving a flow of fluid; an outlet portion for outputting the flow of fluid; and a flow modifier portion disposed between the inlet portion and the outlet portion, the flow modifier portion comprising an outer portion comprising a closed cross-section to the flow of fluid and an inner porous portion configured such that at least a portion of the flow flow received in the inlet portion must pass through the inner porous portion to reach the fluid outlet. Preferred embodiments of this fluid flow modifier device may include any one or a combination of any two or more of any of the following features:

the closed cross-section of the outer portion orthogonal to an axis passing through the inlet portion and the outlet portion increases from the inlet portion to the outlet portion;
the closed cross-section of the outer portion orthogonal to an axis passing through the inlet portion and the outlet portion increases in a substantially continuous manner from the inlet portion to the outlet portion;
the outer portion of the flow modifier portion is tapered;
the closed cross-section of the outer portion has a curved cross-section;
the closed cross-section of the outer portion has a substantially circular cross-section;
the inlet portion comprises an inlet flange for coupling to a supply flange of a supply pipe;
the outlet portion comprises an outlet flange for coupling to a fluid treatment zone inlet;
the flow modifier portion further comprises a first support element configured to support an upstream portion of the inner porous portion with respect to the outer portion;
the first support element is secured to the outer portion;
the first support element is substantially annular;
the first support element further comprising at least a pair of interconnected spoke portions to defined a central support portion;
the central support portion is secured to a cone portion disposed on an upstream portion of the inner porous portion;
the cone portion is non-porous;
the first support element and the outer portion have substantially the same a cross-sectional shape;
the flow modifier portion further comprises a second support element configured to support a downstream portion of the inner porous portion with respect to the outer portion;
the second support portion is substantially annular;
the second support portion comprises a third support portion disposed on a downstream portion of the inner porous portion and a fourth support portion secured with respect to the outer portion;
the third support portion and the fourth support portion are secured with respect to one another;
the third support portion and the fourth support portion are non-removably engaged with respect to one another;
one the third support portion and the fourth support portion comprises a first half of a male-female engagement system and the other of the third support portion and the fourth support comprises a second half of the male-female engagement system;
the third support portion is substantially annular;
the fourth support portion is substantially annular;
the second support portion is configured to define a gap between a downstream portion of the inner porous portion and the outer portion;
the second support portion is configured to define an annular gap between a downstream portion of the inner porous portion and the outer portion;
the gap is in the range of from about 0.060 inches to about 1.500 inches;
the gap is in the range of from about 0.070 inches to about 1.400 inches;
the gap is in the range of from about 0.080 inches to about 1.300 inches;
the gap is in the range of from about 0.090 inches to about 1.200 inches;
the gap is about 1.00 inch;
the inner porous portion has a total open surface area in the range of from about 25% to about 75% of the total surface are of the inner porous portion;
the inner porous portion has a total open surface area in the range of from about 30% to about 70% of the total surface are of the inner porous portion;

the inner porous portion has a total open surface area in the range of from about 35% to about 65% of the total surface are of the inner porous portion;
the inner porous portion has a total open surface area in the range of from about 40% to about 60% of the total surface are of the inner porous portion;
the inner porous portion has a total open surface area in the range of from about 45% to about 55% of the total surface are of the inner porous portion;
the inner porous portion has a total open surface area of about 50% of the total surface are of the inner porous portion;
the inner porous portion comprises a constant porosity;
the inner porous portion comprises a variable porosity;
the inner porous portion comprises a gradient of porosity from an upstream portion thereof to a downstream portion thereof;
the inner porous portion comprises an decreasing gradient of porosity from an upstream portion thereof to a downstream portion thereof;
the inner porous portion comprises an increasing gradient of porosity from an upstream portion thereof to a downstream portion thereof;
the inner porous portion comprises a mesh;
the inner porous portion comprises a perforated sheet;
the inner porous portion comprises a plurality of strips;
the inner porous portion comprises a plurality of radial rings;
the inlet portion has an inner diameter of from about 2 inches to about 48 inches;
the inlet portion has an inner diameter of from about 2 inches to about 36 inches;
the inlet portion has an inner diameter of from about 2 inches to about 30 inches;
the inlet portion has an inner diameter of from about 2 inches to about 24 inches;
the inlet portion has an inner diameter of from about 2 inches to about 18 inches;
the inlet portion has an inner diameter of from about 2 inches to about 12 inches;
the inlet portion has an inner diameter of about 2 inches;
the inlet portion has an inner diameter of about 3 inches;
the inlet portion has an inner diameter of about 4 inches;
the inlet portion has an inner diameter of about 6 inches;
the inlet portion has an inner diameter of about 8 inches;
the inlet portion has an inner diameter of about 10 inches;
the outlet portion has an inner diameter of from about 6 inches to about 60 inches;
the outlet portion has an inner diameter of from about 6 inches to about 48 inches;
the outlet portion has an inner diameter of from about 6 inches to about 42 inches;
the outlet portion has an inner diameter of from about 6 inches to about 36 inches;
the outlet portion has an inner diameter of from about 6 inches to about 30 inches;
the outlet portion has an inner diameter of from about 6 inches to about 24 inches;
the outlet portion has an inner diameter of 16 inches;
the outlet portion has an inner diameter of 12 inches;
the outlet portion has an inner diameter of 8 inches;
the outlet portion has an inner diameter of 6 inches;
the fluid flow modifier is elongate;
the fluid flow modifier device has a length of less than or equal to about 3.5 times an inner diameter of the outlet portion;
the fluid flow modifier device has a length of less than or equal to about 3.0 times an inner diameter of the outlet portion;
the fluid flow modifier device has a length of less than or equal to about 2.5 times an inner diameter of the outlet portion;
the fluid flow modifier device has a length of less than or equal to about 2.0 times an inner diameter of the outlet portion;
the fluid flow modifier device has a length of less than or equal to about 1.5 times an inner diameter of the outlet portion;
the outer portion has a substantially tapered configuration;
the outer portion comprises a taper angle in the range of from about 5° to about 20° between (i) a center axis passing through the inlet portion and the outlet portion, and (ii) a wall of the outer portion;
the inner porous portion has a substantially tapered configuration;
the inner porous portion comprises a taper angle in the range of from about 8° to about 30° between (i) a center axis passing through the inlet portion and the outlet portion, and (ii) a wall of the outer portion;
each of the outer portion and the inner porous portion has a substantially tapered configuration;
(a) the outer portion comprises a first taper angle in the range of from about 5° to about 20° between (i) a center axis passing through the inlet portion and the outlet portion, and (ii) a wall of the outer portion, and (b) the inner porous portion comprises a second taper angle in the range of from about 8° to about 30° between (i) a center axis passing through the inlet portion and the outlet portion, and (ii) a wall of the outer portion;
the second taper angle is greater than the first taper angle;
the outer portion and in inner porous portion are oriented in a substantially coaxial relationship with respect to a center axis passing through the inlet portion and the outlet portion;
the outer portion and in inner porous portion are oriented in a non-coaxial relationship with respect to a center axis passing through the inlet portion and the outlet portion;
the outlet portion and the inlet portion have the same cross-sectional shape;
the outlet portion and the inlet portion have a different cross-sectional shape;
the outlet portion has a curvilinear (e.g., circular, obround, etc.) shape;
the outlet portion has a rectilinear (e.g., retangular, square, etc.) shape;
the inlet portion has a curvilinear (e.g., circular, obround, etc.) shape; and/or
the inlet portion has a rectilinear (e.g., retangular, square, etc.) shape.

With reference to FIG. 1, there is illustrated a fluid treatment system 10. Fluid treatment system 10 comprises a fluid supply pipe 15. Fluid supply pipe comprises a curved portion 20.

Fluid treatment system 10 further comprises a fluid treatment zone 25. Fluid treatment system 10 is shown in schematic form (FIG. 1). It will be understood that fluid treatment zone 25 will include appropriate hardware for treatment of the fluid. For example, if the fluid treatment zone 25 is a radiation fluid treatment zone, it will have a series of radiation source assemblies and associated hardware to secure the lamp assemblies in place for treatment of the fluid. Non-limited examples of suitable fluid treatment zone 25 include the TrojanUVSwift™ water treatment system and the TrojanUVTorrent™ water treatment system. Of course, the present fluid flow modifier device may be used with fluid treatment zones other than those based on the use of radiation source assemblies.

Disposed between fluid supply pipe 15 and fluid treatment zone 25 is fluid flow modifier device 100. It will be seen that, externally, fluid flow modifier device 100 comprises a generally tapered shape to transition the flow from fluid supply pipe 15 to fluid treatment zone 25.

The details of a particularly preferred embodiment of fluid flow modifier device 100 will be described with reference to FIGS. 2-5.

Thus, with reference to FIGS. 2-5, the fluid flow modifier device 100 comprises an inlet portion 105. Inlet portion 105 comprises a flange plate 102 to be secured to a complementary flange plate (not shown) which forms part of fluid supply pipe 15.

At the opposite end of fluid flow modifier device 100 is an outlet portion 110. Outlet portion 110 comprises a flange plate 112 which is configured to connect to the complementary flange plate (not shown) on fluid treatment zone 25.

Disposed between inlet portion 105 and outlet 110 is a tapered outer flow transition portion 115. Disposed within outer flow transition portion 115 is an inner porous flow transition element 117.

The upstream end of inner porous portion 117 is supported by an inlet support nose 119 which in turn is supported by a nose support element 121 which is secured (e.g., by welding) to an inside portion of inlet portion 105.

The downstream end of inner porous portion 117 is supported by an inner support ring 123 which is secured to a support structure 125 that itself is secured (e.g., by welding) to an inner portion outlet portion 110. More particularly, inner support ring 123 comprises a series a slots 124 which are configured to engage a series of tabs 126 disposed on support structure 125.

With particular reference to FIGS. 2, and 5-7, support ring 123 and support structure 125 cooperate to define an annular gap A therebetween—this permits a portion of the fluid entering fluid flow modifier device 100 to pass annularly between outer flow transition portion 115 and inner porous portion 117. The rest of the fluid entering fluid flow modifier device 100 must pass through inner porous 117 to reach outlet portion 110. The provision of gap A allows for provision of a pressure release at the transition which substantially assists in preventing jetting and turbulent flow. Preferably, gap A is adjustable depending on the flow dynamics of the particular system in which fluid flow modifier device 100 is installed.

The provision of inner porous portion 117 provides a relatively high fluid pressure zone B upstream thereof and a relatively low fluid pressure C downstream thereof.

The precise nature of inner porous portion 117 may be varied depending on the specific application of fluid flow modifier device 100. For example, inner porous portion 117 may be made from mesh, wires, perforated metal and the like. The porosity of inner porous portion 117 is preferably as specified above.

The provision of a fluid flow modifier device having a combination of elements described above allows for the overall length of device 100 to be relatively short. For example, it is preferred that the overall length of fluid flow modifier device 100 is less than or equal to 3.5 times the inner diameter of outlet portion 110 which typically corresponds to the inner diameter an inlet of the fluid treatment zone downstream of fluid flow modifier device 100.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

What is claimed is:

1. A fluid flow modifier device comprising:
an inlet portion for receiving a flow of fluid;
an outlet portion for outputting the flow of fluid;
a flow modifier portion disposed between the inlet portion and the outlet portion, the flow modifier portion comprising an outer portion comprising a closed cross-section to the flow of fluid and an inner porous portion configured such that at least a portion of the flow received in the inlet portion must pass through the inner porous portion to reach the fluid outlet, wherein: (i) the flow modifier portion further comprises a first support element configured to support an upstream portion of the inner porous portion with respect to the outer portion and a second support element configured to support a downstream portion of the inner porous portion with respect to the outer portion; (ii) the second support portion is configured to define an annular gap between a downstream portion of the inner porous portion and the outer portion to cause a portion of the flow received in the inlet portion to pass through the annular gap; and the closed cross-section of the outer portion orthogonal to an axis passing through the inlet portion and the outlet portion increases from the inlet portion to the outlet portion.

2. The fluid flow modifier device defined in claim 1, wherein the outer portion of the flow modifier portion is tapered.

3. The fluid flow modifier device defined in claim 1, wherein the first support element and the outer portion have substantially the same a cross-sectional shape.

4. A fluid flow modifier device comprising:
an inlet portion for receiving a flow of fluid;
an outlet portion for outputting the flow of fluid;
a flow modifier portion disposed between the inlet portion and the outlet portion, the flow modifier portion comprising an outer portion comprising a closed cross-section to the flow of fluid and an inner porous portion configured such that at least a portion of the flow received in the inlet portion must pass through the inner porous portion to reach the fluid outlet, wherein: (i) the flow modifier portion further comprises a first support element configured to support an upstream portion of the inner porous portion with respect to the outer portion and a second support element configured to support a downstream portion of the inner porous portion with respect to the outer portion; and (ii) the second support portion is configured to define an annular gap between a downstream portion of the inner porous portion and the outer portion to cause a portion of the flow received in the inlet portion to pass through the annular gap.

5. The fluid flow modifier device defined in claim 4, wherein the gap is in the range of from about 0.060 inches to about 1.500 inches.

6. The fluid flow modifier device defined in claim 1, wherein the inner porous portion has a total open surface area in the range of from about 25% to about 75% of the total surface area of the inner porous portion.

7. The fluid flow modifier device defined in claim 1, wherein the inner porous portion comprises a gradient of porosity from an upstream portion thereof to a downstream portion thereof.

8. The fluid flow modifier device defined in claim 1, wherein the inlet portion has an inner diameter of from about 2 inches to about 48 inches.

9. The fluid flow modifier device defined in claim 1, wherein the outlet portion has an inner diameter of from about 6 inches to about 60 inches.

10. The fluid flow modifier device defined in claim 1, wherein the fluid flow modifier is elongate.

11. The fluid flow modifier device defined in claim 10, wherein the fluid flow modifier device has a length of less than or equal to about 3.5 times an inner diameter of the outlet portion.

12. A fluid flow modifier device comprising:
an inlet portion for receiving a flow of fluid;
an outlet portion for outputting the flow of fluid;
a flow modifier portion disposed between the inlet portion and the outlet portion, the flow modifier portion comprising an outer portion comprising a closed cross-section to the flow of fluid and an inner porous portion configured such that at least a portion of the flow received in the inlet portion must pass through the inner porous portion to reach the fluid outlet, wherein: (i) the flow modifier portion further comprises a first support element configured to support an upstream portion of the inner porous portion with respect to the outer portion and a second support element configured to support a downstream portion of the inner porous portion with respect to the outer portion; (ii) the second support portion is configured to define an annular gap between a downstream portion of the inner porous portion and the outer portion to cause a portion of the flow received in the inlet portion to pass through the annular gap; and (iii) the outer portion comprises a taper angle in the range of from about 5° to about 20° between (i) a center axis passing through the inlet portion and the outlet portion, and (ii) a wall of the outer portion.

13. The fluid flow modifier device defined in claim 1, wherein each of the outer portion and the inner porous portion has a substantially tapered configuration.

14. The fluid flow modifier device defined in claim 13, wherein: (a) the outer portion comprises a first taper angle in the range of from about 5° to about 20° between (i) a center axis passing through the inlet portion and the outlet portion, and (ii) a wall of the outer portion, and (b) the inner porous portion comprises a second taper angle in the range of from about 8° to about 30° between (i) a center axis passing through the inlet portion and the outlet portion, and (ii) a wall of the outer portion.

15. The fluid flow modifier device defined in claim 1, wherein the outer portion and in inner porous portion are oriented in a substantially coaxial relationship with respect to a center axis passing through the inlet portion and the outlet portion.

16. The fluid flow modifier device defined in claim 1, wherein the outer portion and the inner porous portion are oriented in a non-coaxial relationship with respect to a center axis passing through the inlet portion and the outlet portion.

17. The fluid flow modifier device defined in claim 1, wherein the outlet portion and the inlet portion have the same cross-sectional shape.

18. A fluid treatment system comprising a fluid inlet, a fluid outlet and a fluid treatment zone disposed between the fluid inlet and the fluid outlet, the inlet portion of the fluid flow modifier device defined in claim 1 being coupled to the fluid inlet of the fluid treatment system.

* * * * *